Nov. 16, 1965  R. T. McELVENNY  3,217,544
METHOD AND APPARATUS FOR MEASURING TEMPERATURES
Filed Nov. 21, 1962  2 Sheets-Sheet 1

INVENTOR.
Robert T. McElvenny,
BY
Wolfe, Hubbard, Voit & Osann
Attorneys.

Nov. 16, 1965    R. T. McELVENNY    3,217,544
METHOD AND APPARATUS FOR MEASURING TEMPERATURES
Filed Nov. 21, 1962    2 Sheets-Sheet 2

INVENTOR.
Robert T. McElvenny,
BY
Wolfe, Hubbard, Voit & Osann
Attorneys.

United States Patent Office 3,217,544
Patented Nov. 16, 1965

3,217,544
METHOD AND APPARATUS FOR MEASURING TEMPERATURES
Robert T. McElvenny, Chicago, Ill.; Mercantile National Bank of Chicago, executor of said Robert T. McElvenny, deceased
Filed Nov. 21, 1962, Ser. No. 239,228
9 Claims. (Cl. 73—362)

The present invention relates in general to temperature measurement and, more particularly, to improved methods and apparatus for measuring the body temperature of hospital patients.

A major problem encountered in hosiptals or the like is that of providing effective methods and apparatus for accurately measuring the body temperature of a plurality of patients as rapidly as possible, yet without fear of cross-contamination or cross-infection between different patients. This problem has become particularly troublesome due to overcrowded hospital conditions and to shortage of trained hospital personnel. The general practice heretofore employed for measuring body temperature has been to use thermometers of the capillary glass variety (e.g., mercury thermometers) which are used either orally or rectally. However, such thermometers have a number of disadvantages which often create problems in hospitals. For example, care must be taken by hospital personnel to insure that each thermometer is lowered to a sub-normal reading prior to taking the patient's temperature. In order to prevent the patient from either deliberately or accidentally elevating or depressing his true temperature reading through artificial means, it is necessary for the nurse to remain with each patient during the entire measuring period. Moreover, occasionally capillary glass thermometers break because of biting or careless handling, thus subjecting the patient to pain, discomfort and the danger of infection.

Yet another problem encountered with capillary glass thermometers is that considerable time and effort must be devoted by hospital personnel to insure that the thermometers are properly sterilized, as for example, by placing them in antiseptic solutions. Without such proper sterilization, the patients are subjected to the danger of cross-contamination and cross-infection through micro-organisms carried on the thermometers. Even though the greatest care is exercised by hospital personnel, occasionally such cross-contamination occurs.

Some hospitals have attempted to overcome the foregoing disadvantages by utilizing electronic "finger contact" thermometers, however, these have not proven entirely satisfactory for a number of reasons. Since such thermometers are carried from patient to patient, each of whom actually contacts the thermometer, it is desirable that they be sterilized prior to use by each patient. Otherwise, the danger of cross-contamination persists. Nor are the temperature readings comparable with previous readings taken, for example, in the home by capillary glass thermometers. And, unless each reading is taken by the same thermometer, any given reading is not entirely significant with respect to previous and subsequent readings.

It is a general aim of the present invention to provide an improved method and apparatus for measuring body temperature characterized in that such temperature measurements may be taken rapidly and accurately, yet wherein there is no danger of cross-contamination or cross-infection of patients arising from use of the temperature measuring equipment. While not so limited in its application, the invention will find especially advantageous use in the repetitive or periodic measurement of the body temperatures of hospital patients.

A related object of the invention is to provide a temperature measuring method and apparatus for taking repetitive or periodic measurements of the body temperatures of hospital patients, particularly hospital in-patients, wherein each patient, upon entering the hospital is assigned a sterile disposable kit including a temperature-sensitive probe, which kit is retained by the patient at all times during his confinement and which is disposed of when the patient is discharged. As a consequence of attaining this objective, there is no possibility that successive patients occupying the same bed, or different patients simultaneously present in a hospital, can cross-infect or cross-contaminate one another because of micro-organisms carried by the temperature-sensitive probe.

A coordinate object of the invention is to provide a method and apparatus for taking repetitive or periodic temperature readings from a given patient wherein every temperature reading is entirely significant with respect to previous and subsequent readings since all readings for that patient are obtained with a single temperature-sensitive probe, that probe being the one assigned to and retained by that patient. In this connection, it is an object of the invention to provide a method and apparatus for measuring body temperature wherein each temperature reading is not only entirely significant with respect to all other readings, but also where each temperature reading is comparable to readings obtained on conventional capillary glass thermometers prior to and subsequent to the patient's hospital confinement.

It is a more specific object of the invention to provide a disposable kit including a sterile temperature-sensitive probe and receptacle therefor, which kit may be used by the patient during his entire confinement and disposed of upon his discharge.

An important and more detailed object of the invention is to provide a disposable, sterile, temperature-sensitive element which is not subject to breakage because of biting or improper handling and which is suitable for use in measuring the body temperature of hospital patients, such element characterized by its ability to be selectively plugged into a portable display device calibrated in degrees, thus permitting hospital personnel to obtain almost instantaneous temperature readings which are considerably more accurate than heretofore possible and which cannot be artifically elevated or depressed by a patient, either accidentally or deliberately. Such an arrangement permits the use of display meters of the type employing deflectable needles, thus further enhancing the rapidity of each reading and minimizing the danger of inaccurate temperature readings which may result in the institution of malpractice suits, while at the same time permitting such measurements to be made by relatively untrained personnel.

Still another object of the invention is to provide a method and apparatus for measuring body temperature wherein the probe assigned to, and retained by, each patient is disposed in proximity to a source of germicidal energy during intervals between successive measurements, thus arresting the growth of the patient's own pathogens on the probe and preventing deposit on the probe of micro-organisms foreign to the patient's body. Consequently, there is no requirement that hospital personnel devote time and care to insuring that the temperature-sensitive element is sterilized after each use, nor is there any requirement that antiseptic solutions be carried from room to room for the purpose of sterilizing each patient's probe.

Other objects and advantages of the invention will become apparent as the following description proceeds, taken in conjunction with the accompanying drawings in which:

FIG. 3 is a perspective view of a disposable sterile kit for use with the present invention and here including a temperature-sensitive probe and receptacle therefor packaged within a container, a portion of the container being cut away to illustrate the interior thereof; and, FIG. 4 is a schematic wiring diagram illustrating the circuit details of the exemplary apparatus shown in FIG. 12.

Figure 1:
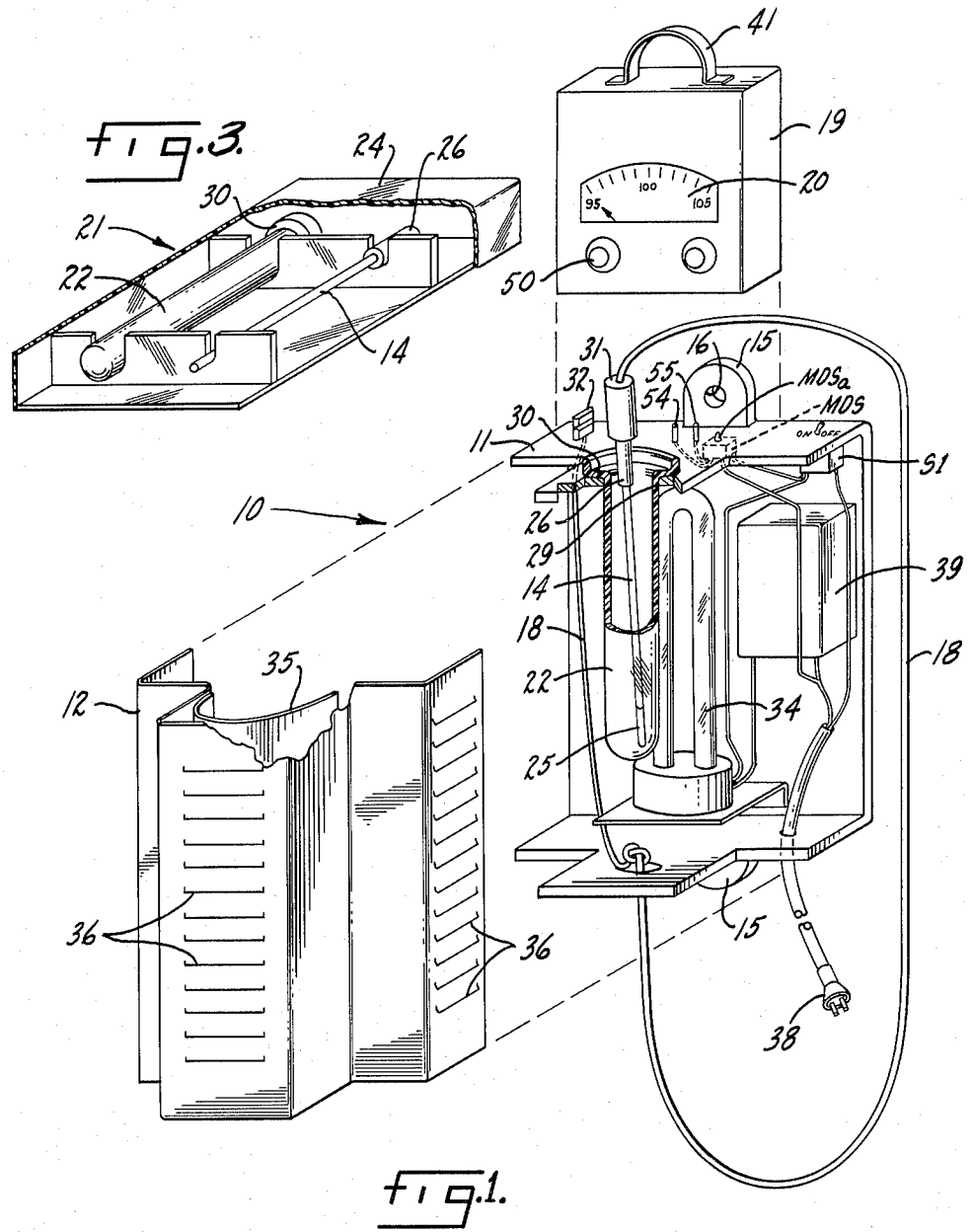
FIGURE 1 is a perspective view of an exemplary temperature measuring apparatus embodying the features of the present invention, here shown with the cover assembly in exploded form.

While the invention is susceptible of various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents and alternatives falling within the spirit and scope of the invention as expressed in the appended claims.

Referring now to the drawings, there is illustrated in FIG. 1, an exemplary temperature measuring apparatus, generally indicated at 10, suitable for measuring temperatures in accordance with features of the present invention. As the description proceeds, it will become apparent that the present invention will find use in a wide variety of environments, such for example, as hospitals or other institutional type buildings used in caring for persons who are ill, confined, or otherwise being treated, and where it is required that the institution obtain on a periodic or repetitive basis the temperatures of a plurality of persons, both in-patients, and out-patients. However, in order to facilitate the ensuing discussion, the invention will here be described in conjunction with apparatus and methods for taking repetitive temperature measurements of hospitalized in-patients.

In the illustrative form of the invention, the temperature measuring apparatus 10 includes a housing 11 having a removable cover 12, the housing serving to receive and removably store a temperature-sensitive probe 14 during intervals between successive temperature measurements for a given patient. For the purpose of fixedly or permanently mounting the housing 11 on a wall (not shown) of the patient's room, or other structural member in proximity to the patient's bed, the housing includes a pair of mounting lugs 15 defining apertures 16 suitable for reception of screws or other types of fasteners (not shown). The probe 14 is adapted to be separably coupled by means of a flexible lead 18 to a display device 19. In the exemplary apparatus, the display device 19 includes a voltmeter 20 calibrated in degrees. However, it will be understood that the display device may take other forms dependent upon the type of probe employed.

In accordance with one of the important aspects of the present invention, there is provided a novel temperature measuring system wherein the temperature-sensitive element which directly contacts the patient during measurement of his temperature is retained by the patient in a disposable receptacle during his confinement, used solely by that patient during such confinement, and disposed of along with the receptacle upon his discharge, thus insuring that the patient's own pathogens will not come into contact with other patients either simultaneously present in the hospital or successively occupying the same bed. In the exemplary form of the invention, this is accomplished by providing for each patient a disposable kit, generally indicated at 21 (FIG. 3), which contains a sterile temperature-sensitive probe 14 and a sterile receptacle 22 therein.

In order to maintain the probe 14 and receptacle 22 in a sterile condition, they are sealed within a suitable package or container 24 which may have any desirable configuration and which may be made of any suitable material, for example, polyethylene. In the illustrative form of the invention, the probe 14 has a relatively thin, elongate shaft of plastic material having sufficient rigidity to resist bending forces applied thereto, yet having sufficient flexibility that the shaft will not readily break when subjected to bending or clamping forces, as for example, when a patient bits down too hard. The probe 14 may, merely by way of example, be made of polyethylene or similar plastic material. The receptacle 22 is also formed of a plastic material, e.g., polyethylene or an acrylic plastic, having a configuration similar to that of a test tube with a relatively thin sidewall that is preferably transmissive of ultraviolet radiation. For the purpose of insuring that the probe 14 and receptacle 22 are delivered to the hospital in sterile condition ready for use, the components are sterilized as an incident to their manufacture or packaging as for example, by subjecting them to a fumigating mixture of ethylene oxide and carbon dioxide. Of course, other suitable fumigants or appropriate antiseptic solutions can be used if desired.

Figure 4:
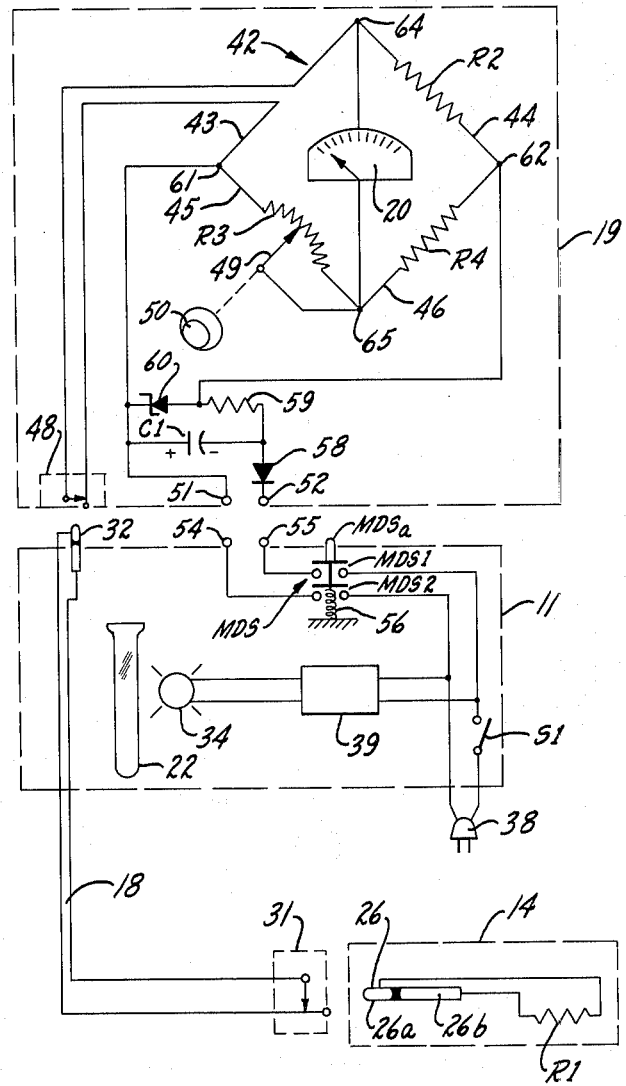

In keeping with the present invention, the probe 14 has embedded in one end 25 thereof, a temperature-sensitive element or transducer capable of rapidly converting the body temperature sensed into a control signal proportional to the temperature sensed, which signal is transmitted to the display device 19. While the transducer may take a variety of forms, it is here shown (FIGS. 1 and 4) as a thermally sensitive electrical element characterized by its ability to produce a resistance or voltage value which is proportional to the temperature sensed. In the illustrated construction, the thermally sensitive element comprises a thermally sensitive impedance or resistance R1 having a high temperature coefficient of resistance. The opposite ends of the resistance R1 are electrically coupled to the contact portions 26a, 26b respectively of a disconnect plug 26 integral with the probe 14. Of course, those skilled in the art will appreciate that a thermally sensitive PN junction diode or a thermocouple could be employed rather than the resistance R1.

Keeping the foregoing description in mind, it will be observed that when a patient is admitted to the hospital, it is merely necessary that he be assigned a disposable kit 21 which he will retain during his entire period of confinement. The nurse or floor supervisor thus need only open the container 24, remove the sterile receptacle 22, and insert it in an opening 29 formed in the top of the housing 11. The receptacle 22 is suspended in the housing by means of an outwardly flared lip portion 30 integral with the upper end of the receptacle. The plug 26 on the sterile probe 14 is then plugged into a miniature disconnect device or phone-type jack 31 integral with the free end of the elongate flexible lead 18 and the probe 14 is inserted into the receptacle 22. The opposite end of the electrical lead 18 passes upwardly through the housing 11 and terminates in an upwardly extending plug 32 which may be similar to the plug 26. It will be understood that the details of the electrical plugs and jacks or receptacles are not critical to the present invention and they may take a variety of forms. However, such plugs and receptacles are preferably of the type having a low contact resistance.

Figure 2:
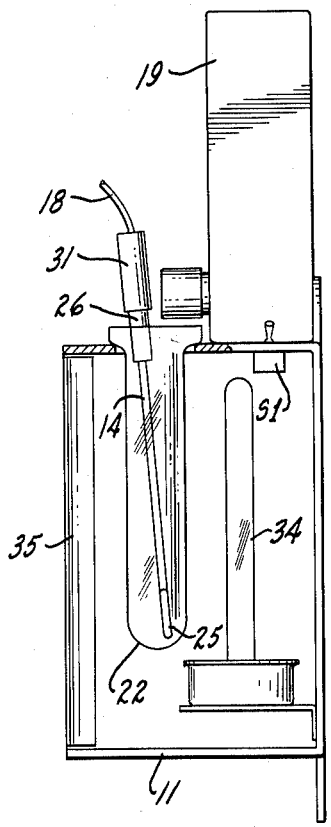
FIG. 2 is a vertical sectional view of the apparatus shown in FIG. 1 illustrating particularly a portable temperature display device coupled to the temperature-sensitive element of the apparatus.

For the purpose of insuring that the probe 14 remains free of airborne bacteria or micro-organisms foreign to the patient's body, provision is made for subjecting the probe to germicidal radiation during intervals between succesive temperature measurements. As best illustrated in FIGS. 1 and 2, this may be accomplished by mounting a germicidal lamp 34 within the housing 11 adjacent to the receptacle 22. The lamp 34 may, merely by way of example, simply be a mercury vapor lamp characterized by its ability to emit ultraviolet radiation. The arrangement is such that the ultraviolet radiations emitted by the lamp 34 are directed towards the receptacle 22 and through the sidewall thereof to the probe 14, thus insuring that airborne bacteria or micro-organisms foreign to the patient's body cannot be deposited on either the probe or the receptacle. Of course, during either oral or rectal temperature measurements, the probe 14 will be contaminated by the patient's own pathogens and/or with particles of the patient's fecal matter. However, the ultraviolet radiation will also prevent proliferation of the patient's own pathogens. To further enhance the germicidal action, provision is made for reflecting ultraviolet radiation back towards the receptacle. This is accomplished by mounting a mirror or reflector 35 in the housing 11 in proximity to the receptacle 22 but disposed on the opposite side thereof relative to the germicidal lamp 34. The reflector may, if desired, be rigidly secured to the housing cover 12 by suitable fasteners (not shown). To insure that the maximum amount of germicidal energy, or ultraviolet radiation, reaches the receptacle, and, therefore the "parked" probe 14, the reflector 35 is preferably made of a material characterized by its ability to reflect ultraviolet radiant energy—that is, radiant energy having wavelengths less than 380 millimicrons (380 m$\mu$).

From the foregoing it will be seen that the probe 14, when "parked" or stored in the receptacle 22, will be maintained in a region of ultraviolet radiation which, because of its germicidal action, will arrest the growth of the patient's own pathogens while simultaneously preventing deposition of micro-organisms foreign to the patient's body on the probe. However, since the lamp 34 also emits radiant energy in other portions of the physical spectrum (for example, radiant energy in the visible or ocular spectrum having wavelengths greater than 380 millimicrons but less than 760 millimicrons, and radiant energy in the infrared spectrum having wavelengths greater than 760 millimicrons) the probe 14 will also be subjected to heat. This heating effect is primarily due to the radiation in the infrared spectrum, and radiation in the higher frequency portions of the visible spectrum, although ultraviolet radiation will also produce some heat. Since the heat produced by the lamp 34 is substantially contsant and since the probe 14 is located in close proximity to the lamp 34, the probe will sense an elevated temperature condition which is substantially independent of the ambient air temperature in the patient's room. As a consequence of this arrangement, the probe 14, when placed in the receptacle 22, will sense the elevated temperature and the resistance value of the heat sensitive resistance R1 will increase until it reaches a point of equilibrium, which is substantially independent of the ambient room temperature. The temperature equilibrium achieved is, therefore, a quantity which is known or which can be readily determined with a high degree of accuracy for each apparatus 10. Consequently, and as will be described in greater detail below, the elevated temperature equilibrium achieved by the probe 14 during intervals between succesive measurements can be utilized by the nurse to properly adjust the display device 19 to a zero reference point, e.g., to 98.6° F. representative of the normal body temperature, thus greatly increasing the accuracy of the equipment.

In keeping with the foregoing aspect of the present invention, provision is made for facilitating rapid attainment of a fixed temperature equilibrium point for a "parked" or stored probe 14. To this end, the housing cover 12 may be provided with a plurality of louvers or ventilation openings 36 which tend, through convection, to decrease the time required for the probe to reach an equilibrium temperature level. Of course, numerous other means could be employed for insuring that the probe 14 rapidly attains a known equilibrium level. Merely by way of example, it would be possible to form the reflector 35 of dichroic material characterized by its ability to reflect ultraviolet energy while transmitting the heat producing infrared energy and all or portions of the visible light spectrum. If this latter construction is employed, it is desirable to introduce a second dichroic mirror (not shown) between the germicidal lamp 34 and the receptacle 22—the second mirror characterized by its ability to transmit ultraviolet radiation while simultaneously reflecting the undesirable infrared and all or portions of the visible light spectrum. By suitable selection of the dichroic constituents of the mirrors or reflectors, fine control of the amount of heat transmitted to the probe can be achieved, thus insuring that the probe will always attain the same equilibrium level irrespective of ambient room temperature and/or the strength of the lamp 34.

For the purpose of selectively energizing the germicidal lamp 34 during periods when the apparatus 10 is in use (including intervals between successive temperature measurements) and for selectively de-energizing the lamp when the apparatus is not in use (i.e., when no patient is occupying the bed adjacent the apparatus), the lamp 34 is energized from an A.C. supply (not shown), for example, by coupling the lamp to a wall mounted receptacle with a plug 38. In this instance, the energizing circuit also includes a ballast and starter (diagrammatically illustrated at 39 in FIGS. 1 and 4). The energizing circuit also includes an "ON-OFF" switch S1 which is here shown mounted on the top of the housing 11. Thus, when a patient is admitted to the hospital, the nurse, at the same time she initially opens the disposable kit 21, plugs the probe 14 into the jacket 31, and inserts the probe and receptacle 22 into the housing, will simply move the switch S1 to the ON position, thereby energizing the germicidal lamp 34 and subjecting the probe 14 to ultraviolet radiation.

In accordance with another important aspect of the invention, provision is made for simultaneously facilitating the display of temperature information sensed by the probe 14 and increasing the accuracy with which each temperature reading can be recorded, while at the same time reducing the total cost of the overall hospital temperature measuring installation. To this end, the display device 19 is portable and is provided with a handle 41 which enables the nurse to carry the device from room to room when she is in the process of taking temperatures. In keeping with this aspect of the invention the display device 19 includes means responsive to the variable parameter of the probe 14 for producing an output signal proportional to the temperature sensed. In the exemplary apparatus shown in FIG. 4, this is accomplished by providing a bridge circuit which may take the form of a Wheatstone bridge 42 (FIG. 4) having two pairs of arms 43, 44 and 45, 46 respectively. A plurality of impedances, which are here shown as resistances R1, R2, R3 and R4, are respectively connected in the arms 43, 46. The bridge arm 43 is electrically connected to a receptacle (diagrammatically illustrated at 48 in FIG. 4) having a pair of terminals positioned to be electrically coupled with the plug 32 projecting upwardly from the housing 11. Therefore, it will be appreciated that the resistance R1 in the bridge arm 43 is, in actuality, the temperature-sensitive resistance embedded in the end of the probe 14. Consequently, the resistance R1 constitutes a "plug-in" resistance for the bridge 42, the value of which will vary with changes in the temperature sensed by the probe. The resistances R2 and R4 in arms 44 and 46 are fixed resistances. The arm 45 including resistance R3 is provided with a variable tap 49 controlled by an adjustable knob 50 mounted on the face of the display device (FIGS. 1 and 4), thereby providing means for adjusting or calibrating the bridge.

For the purpose of energizing the exemplary bridge circuit 42, the display device 19 includes a female receptacle having a pair of terminals 51, 52 which are adapted to be respectively coupled to a pair of upwardly projecting male terminals 54, 55, the latter being electrically coupled to the A.C. voltage source (not shown) by plug 40 through the normally open contacts MDS1, MDS2 of a "meter-down" switch MDS. The contacts of the exemplary "meter-down" switch MDS are biased to their normally open position by means of a spring 56. The arrangement is such that when the nurse places the display device 19 on the housing 11, the power supply terminals 51, 52 respectively mate with the terminals 54, 55, the plug 32 is received within receptacle 48 (thus "plugging" the probe resistance R1 into the bridge 42), and the bottom of the display device engages an actuator MDS*a* for the switch MDS, thus closing the switch contacts MDS1, MDS2 against the bias of spring 56 and completing an energizing circuit for the bridge. It will be observed upon inspection of FIG. 4 that the alternating current applied to the terminals 51, 52 of the display device 19 is rectified by a diode 58 and smoothed by a capacitor C1 having a resistor 59 and a Zener diode 60 connected thereacross. The voltage appearing across the Zener diode 60, due to its well-known inverse conduction characteristics, is a precisely regulated D.C. voltage which in turn is applied to the energizing terminals or junctions 61, 62 of the bridge 42. The voltmeter 20 is connected across bridge terminals 64, 65, which are here shown as the midpoints of the pairs of bridge arms 43, 44, and 45, 46 respectively.

Those skilled in the art will appreciate that a bridge circuit of the foregoing type comprises, in effect, two voltage dividing networks, where each pair of arms represents one voltage divider, and where the voltmeter 20 provides a means for comparing the voltage levels at the terminals 64, 65 in the two respective networks. Therefore, if it is assumed, merely by way of example, that the equilibrium temperature sensed by the resistance R1 during periods when it is "parked" in the receptacle 22 is 95° then, it is merely necessary for the nurse to plug the portable display device 19 into the housing 11 and adjust the knob 50 (and therefore resistance R3) until the meter 20 reads 95°. The display device 19 is now calibrated to provide an accurate indication of the patient's temperature.

It is then merely necessary to remove the probe 14 from the receptacle 22 and insert it into the patient either rectally or orally. The resistance value of the temperature-sensitive resistance R1 embedded in the probe 14 will then change to a value proportional to the actual body temperature detected. Consequently, the voltage drops across resistances R1 and R2 will change and the voltage level at terminal 64 will change. The voltmeter 20 which compares the voltage levels present at terminals 64 and 65, will therefore provide a visual indication of the body temperature detected by the probe 14.

Since the temperature-sensitive resistance R1 is characterized by its ability to provide an almost immediate response (within a matter of a few seconds), the temperature indication displayed on the meter 20 will be almost instantaneous and the nurse will be able to immediately record it. Thus, there is little possibility that the patient can either artificially elevate or depress the temperature reading. Moreover, since the meter 20 includes a scale having widely spaced graduations calibrated in degrees and a deflectable needle, the instrument may be read with considerably greater ease and accuracy than is possible with capillary glass thermometers.

Upon completion of the temperature measurement, the nurse simply removes the probe 14 from its position within the patient's body and returns it to the receptacle 22 where it is again subjected to ultraviolet radiation emanating from the germicidal lamp 34. Thus, there is no need for the nurse to sterilize the probe. The nurse will then remove the display device 19 and proceed to the next patient's room. It will be appreciated that the probe 14 and receptacle 22 can be utilized by the same patient during his entire confinement in the hospital. Since these components do not come in contact with any other patient, there is no possibility of cross-contamination or cross-infection between patients. Of course, in the event that it becomes necessary or desirable to shift from rectal temperature to oral temperature measurements, the patient will be assigned a new sterile disposable kit 21.

It will be appreciated from the foregoing that there has been provided a novel method for making repetitive temperature measurements for institutionalized patients wherein (1) each measurement may be rapidly made with a high degree of accuracy, (2) each measurement is entirely significant with respect to preceding and subsequent measurements since all readings are based on use of the same equipment, and (3) where there is no need to devote time and care to sterilizing and segregating the temperature measuring equipment. This is accomplished by the simple expedient of assigning to each patient his own disposable kit including a temperature-sensitive probe and receptacle therefor, placing the probe and receptacle in a fixed stationary housing in proximity to the patient's bed, subjecting the probe and receptacle to germicidal radiation during intervals between successive readings, inserting one end of the probe into a body cavity in the patient during temperature measuring periods and plugging the opposite end thereof into a portable display device, returning the probe to the receptacle upon completion of each reading and disposing of the probe and receptacle when the patient is discharged or when there is a shift from rectal to oral measurements.

I claim as my invention:

1. A temperature measuring system comprising, in combination, a fixed housing, a germicidal lamp contained within said housing for producing radiant energy, a disposable receptacle removably mounted in said housing in proximity to said source, said receptacle having a sidewall transmissive of said radiant energy, a disposable temperature-sensitive probe adapted to be selectively and removably stored in said receptacle so as to be subjected to said radiant energy during periods of storage, means associated with said housing for insuring that said probe resides at a known temperature equilibrium level during periods of storage in said receptacle, said probe including an impedance which varies in value in response to variation in temperature, a disconnect device mounted on said probe and coupled to said impedance, a display device including bridge circuit means, one arm of said bridge circuit means including disconnected means for separably coupling said disconnect device to said bridge circuit means, a second arm of said bridge circuit means including an adjustable impedance, means for coupling two terminals of said bridge circuit means to a voltage source, a meter coupled across two other terminals of said bridge circuit means for displaying the temperature detected by said probe, and means for adjusting said adjustable impedance while said probe resides at said known equilibrium level so as to calibrate said display device.

2. The method of making repetitive measurements of the body temperatures of each of a plurality of hospital patients which comprises, assigning to each patient a disposable kit including a sterile temperature-sensitive probe, establishing a stationary source of germicidal energy in the room for each patient, positioning each patient's probe in proximity to the source of germicidal energy in that patient's room during intervals between successive measurements so that the probe will not be contaminated by micro-organisms foreign to the patient, removing each patient's probe from its position in proximity to the source of germicidal energy and coupling the probe to a portable temperature display device during temperature measuring periods, and disposing of the probe upon discharge of the patient from the hospital.

3. The method of making repetitive measurements of the body temperatures of each of a plurality of hospital patients which comprises, assigning to each patient a disposable kit including a sterile temperature-sensitive probe and a sterile receptacle therefor, creating a stationary source of germicidal radiation in the room for each patient, positioning each patient's receptacle in proximity to the source of germicidal radiation in that patient's room, storing each patient's probe in the corresponding receptacle during intervals between the successive measurements so that the probe will not be contaminated by micro-organisms foreign to the patient, removing each patient's probe from its receptacle and coupling the probe to a portable temperature display device during temperature measuring periods, and disposing of the probe and receptable upon discharge of the patient from the hospital.

4. The method of making repetitive measurements of the body temperatures of each of a plurality of hospital patients which comprises, assigning to each patient a disposable kit including a sterile temperature-sensitive probe, creating a stationary source of heat producing and germicidal radiation in the room for each patient, positioning each patient's probe in proximity to the source of radiation in that patient's room during intervals between the successive measurements so that the probe will not be contaminated by micro-organisms foreign to the patient and so that the probe will attain a known temperature equilibrium level, coupling the probe to a portable temperature display device, adjusting said device to indicate a temperature corresponding to said known equilibrium level, removing said probe from its position in proximity to the source of radiation during temperature measuring periods, and disposing of the probe upon discharge of the patient from the hospital.

5. A temperature measuring system for measuring the body temperatures of patients located in institutional-type buildings comprising, in combination, an immovable housing including means for fixedly securing said housing to a structural member in said building, a source of germicidal energy contained within said housing, a disposable receptacle adapted for use with only a single given patient, said receptacle removably mounted in said housing in proximity to said source, said receptacle having a sidewall transmissive of said energy, a disposable temperature-sensitive probe adapted for use with only said one given patient, said probe being selectively and removably stored in said receptacle so as to be subjected to said germicidal energy during periods of storage whereby the growth of said given patient's pathogens is arrested and the deposit of micro-organisms foreign to said given patient on the probe is precluded, said disposable probe and said disposable receptacle being adapted for repetitive use by said given patient, and portable display means separably coupled to said probe for providing an indication of the temperature sensed thereby, said housing, source and portable display means being adapted for use by a plurality of patients.

6. A temperature measuring system for measuring the body temperatures of patients located in institutional-type buildings comprising, in combination, an immovable housing including means for fixedly securing said housing to a structural member in said building, a source of germicidal energy contained within said housing, a disposable receptacle adapted for use with only a single given patient, said receptacle removably mounted in said housing in proximity to said source, said receptacle having a sidewall transmissive of said energy, a disposable temperature-sensitive probe adapted for use with only said one given patient, said probe being selectively and removably stored in said receptacle so as to be subjected to said germicidal energy during periods of storage whereby the growth of said given patient's pathogens is arrested and the deposit of micro-organisms foreign to said given patient on the probe is precluded, said disposable probe and said disposable receptacle being adapted for repetitive use by said given patient, said probe including means having a parameter that varies in proportion to the temperature to which it is exposed, and portable display means coupled to said probe and responsive to said variable parameter for producing an output signal representative of the temperature sensed by said probe, said housing, source and portable display means being adapted or use by a plurality of patients.

7. A temperature measuring system for measuring the body temperatures of patients located institutional-type buildings comprising, in combination, an immovable housing including means for fixedly securing said housing to a structural member in said building, a source of germicidal energy contained within said housing, a disposable receptacle adapted for use with only a single given patient, said receptacle removably mounted in said housing in proximity to said source, said receptacle having a sidewall transmissive of said energy, a disposable temperature-sensitive probe adapted for use with only said one given patient, said probe being selectively and removably stored in said receptacle so as to be subjected to said germicidal energy during periods of storage whereby the growth of said given patient's pathogens is arrested and the deposit of micro-organisms foreign to said given patient on the probe is precluded, said disposable probe and said disposable receptacle being adapted for repetitive use by said given patient, said probe including means having a parameter that varies in proportion to the temperature to which it is exposed, a portable display device including circuit means for producing an output signal proportional to said variable parameter means, and means for separably inserting said variable parameter means into said circuit means, said housing, source and portable display device being adapted for use by a plurality of patients.

8. A temperature measuring system for measuring the body temperatures of patients located institutional-type buildings comprising, in combination, an immovable housing including means for fixedly securing said housing to a structural member in said building, a source of germicidal energy contained within said housing, a disposable receptacle adapted for use with only a single given patient, said receptacle removably mounted in said housing in proximity to said source, said receptacle having a sidewall transmissive of said energy, a disposable temperature-sensitive probe adapted for use with only said one given patient, said probe being selectively and removably stored in said receptacle so as to be subjected to said germicidal energy during periods of storage whereby the growth of said given patient's pathogens is arrested and the deposit of micro-organisms foreign to said given patient on the probe is precluded, said disposable probe and said disposable receptacle being adapted for repetitive use by said given patient, a portable display device including means defining a pair of voltage divider network, one of said networks including a thermally sensitive impedance, said thermally sensitive impedance being separably connected to said one network and embedded in said probe, means for coupling said networks to a voltage source, and means for comparing the voltage levels at selected junctions in said two networks, said housing, source and portable display device being adapted for use by a plurality of patients.

9. A temperature measuring system for measuring the body temperatures of patients located institutional-type buildings comprising, in combination, an immovable housing including means for fixedly securing said housing to a structural member in said building, a source of germicidal energy contained within said housing, a disposable receptacle adapted for use with only a single given patient, said receptacle removably mounted in said housing in proximity to said source, said receptacle having a sidewall transmissive of said energy, a disposable temperature-sensitive probe adapted for use with only said one given patient, said probe being selectively and removably stored in said receptacle so as to be subjeced to said germicidal energy during periods of storage whereby the growth of said given patient's pathogens is arrested and the deposit of micro-organisms foreign to said given patient on the probe is precluded, said disposable probe and said disposable receptacle being adapted for repetitive use by said given patient, said probe including an impedance which varies in value in response to variation in temperature, a disconnect device mounted on said probe and coupled to said impedance, a portable display device including bridge circuit means, one arm of said bridge circuit means including disconnect means for separably coupling said disconnect device to said bridge circuit means, means for coupling two terminals of said bridge circuit means to a voltage source, and a meter coupled across two other terminals of said bridge circuit means, said housing, source and portable display device being adapted for use by a plurality of patients.

References Cited by the Examiner

UNITED STATES PATENTS

| | | | |
|---|---|---|---|
| 1,474,891 | 11/1923 | Burt et al. | 73—374 |
| 2,144,103 | 1/1939 | Chaney et al. | 73—374 |
| 2,358,570 | 9/1944 | Goldberg | 21—54 |
| 2,763,735 | 9/1956 | Wahl | 21—102 |
| 2,938,385 | 5/1960 | Mack et al. | 73—362 |
| 3,036,464 | 5/1962 | Beeston | 73—362 |
| 3,087,338 | 4/1963 | Horbinski et al. | 73—362 |
| 3,091,693 | 5/1963 | Rudomanski et al. | 73—355 |
| 3,100,842 | 8/1963 | Tellefsen | 250—51 |

LOUIS R. PRINCE, *Primary Examiner.*

ISAAC LISANN, *Examiner.*